United States Patent

[11] 3,628,710

| [72] | Inventors | Max Stehle<br>Mannheim;<br>Egon Kirchner, Mannheim-Feudenheim,<br>both of Germany |
|---|---|---|
| [21] | Appl. No. | 791,821 |
| [22] | Filed | Aug. 26, 1968 |
| [45] | Patented | Dec. 21, 1971 |
| [73] | Assignee | Brown Boveri & Cie Aktiengesellschaft<br>Mannheim-Kafertal, Germany |
| [32] | Priority | Aug. 24, 1967 |
| [33] | | Germany |
| [31] | | P 16 27 153.7 |

[54] APPARATUS FOR SEVERING OF METAL BAND
9 Claims, 17 Drawing Figs.

[52] U.S. Cl. .................................................. 225/96.5,
83/8, 83/11, 83/51, 83/107, 83/428, 225/3,
225/97, 225/99
[51] Int. Cl. .................................................. B26f 3/00
[50] Field of Search ................................... 225/96.5,
96, 98, 99, 104, 97, 94, 95, 2, 3; 83/51, 107, 428,
338, 8, 10, 11; 242/56.2, 2, 56.4, 56.5

[56] References Cited
UNITED STATES PATENTS

| 1,021,028 | 3/1912 | Wescott ........................ | 83/428 X |
| 1,127,448 | 2/1915 | Jullien ........................... | 83/428 X |
| 1,690,908 | 11/1928 | Preston ........................ | 225/3 X |
| 1,758,410 | 5/1930 | Reichel ........................ | 225/96 |
| 1,953,680 | 4/1934 | Johansen ...................... | 225/96 |
| 2,053,375 | 9/1936 | Nicholas ....................... | 225/99 X |
| 2,609,049 | 9/1952 | Rayburn ....................... | 225/3 X |
| 3,416,347 | 12/1968 | Walsh et al. ................. | 83/51 X |

*Primary Examiner*—Frank T. Yost
*Attorneys*—Arthur E. Wilfond, Herbert L. Lerner and Daniel J. Tick

ABSTRACT: Apparatus for severing a metal band with a chip-removing tool includes drawing off a metal band from a supply reel, feeding the metal band for a given peripheral angle about a support roller in a groove-forming apparatus, cutting in the metal band and lengthwise thereof at least one groove having a depth equal to at least half the thickness thereof with a tool adjustable during the cutting operation in a direction transverse to the direction of feed of the metal band, and finally separating the remaining material at the bottom of the groove along the groove so as to divide the metal band into at least two bands, and apparatus for carrying out the method.

APPARATUS FOR SEVERING OF METAL BAND

Our invention relates to an apparatus for severing metal bands, more particularly, by means of chip-removing tools.

Since a metal band is advantageously rolled as a relatively wide band for economic reasons, it must be divided longitudinally or transversely to the longitudinal axis thereof into component bands or plates in order to be further processed. To maintain an optimum utilization of the material of the wide band, the component bands or plates are given a shape which approaches as close as possible that of the finished part to be made therefrom. Thus, for producing rotor and stator plates of electrical machines or circular parts such as deep-drawn or cuplike parts, the component bands or plates are preferably provided with wave-shaped cutting edges.

A method is known wherein a metal band is drawn off a supply reel and is fed to band-severing shears by means of a gripper feed mechanism. The shears slice the metal band transversely to the feed direction thereof into plates with straight, step-shaped or wave-shaped cutting edges, and the plates are then fed to a stacking device (Mitt.-Forschungsgesellschaft Blechverarbeitung, 1967, No. 9/10, pp. 77–82). The severing of a metal band transversely to the longitudinal axis thereof into small plates has a disadvantage, however, in that the relatively short plates are unsuitable for further processing, for example into rotor and stator plates in jigsaw presses which are capable of performing several operations in one stamping motion and thereby function with a high degree of efficiency. Such jigsaw presses are expediently equipped with component bands having relatively great lengths.

It is furthermore known to sever a metal band by means of a pair of cutting rollers having mutually conforming circular blades with a straight or wave-shaped development into component bands with straight or wave-shaped cutting edges depending upon the particular type of blade employed (Iron Age Metal Working International, Jan. 1967). It is disadvantageous, however, in the latter as well as in the previously mentioned method that the phenomenon, known to the man of ordinary skill in the technological art of severing and stamping as the saber effect, causes the component bands to experience elongations which deviate considerably from the original length of the metal band. The elongations are undesirable, particularly for the further processing of component bands with wave-shaped cutting edges in the aforedescribed jigsaw presses, because such jigsaw presses, with respect to the individual lengths of the waves, allow for tolerances of only several hundredths of a millimeter per punch or stroke whereas the elongations on the other hand can be considerably greater.

Furthermore, the aforedescribed known methods have the disadvantage that the component bands or the component plates are formed with burrs on the cutting edges thereof when they are cut or stamped out of the wide band. When subsequently winding or stacking the component bands or plates respectively, these burrs can damage the surface of the adjacent sheet metal layers. When the sheet metal is further employed as rotor or stator plates this damage is undesirable with regard to the magnetic flux.

It is also known, for example, to use chip-removing severing tools for straightening the edges of rolled metal sheets or plates (German Pat. No. 1,022,079). However, chip-removing tools have never been mentioned in connection with the severing of metal bands into component bands, particularly component bands with wave-shaped cutting edges.

It is accordingly an object of our invention to provide method and apparatus for severing of a metal band in the longitudinal direction thereof into component bands, and more particularly severing them with wave-shaped cutting edges, without increasing the length of the component bands and without forming burrs on the cutting edges.

With the foregoing and other objects in view, we provide, in accordance with the invention, method of severing a metal band with a chip-removing tool which comprises drawing off a metal band from a supply reel, feeding the metal band a given peripheral angle about a support roller in a groove-forming apparatus, cutting in the metal band and lengthwise thereof at least one straight or curved groove, having a depth equal to at least half the thickness of the band, with a tool of the apparatus adjustable during the cutting operation in a direction transverse to the direction of feed of the metal band, and finally separating the remaining material at the bottom of the groove by chipping it away or splitting or cracking it or breaking it through along the groove so as to divide the metal band into at least two bands.

The depth of the groove or grooves is substantially dependent upon the choice of tool of the final separating device and of the type of material of the metal band. When employing chip-removing tools in the final separating device, the grooves are to be formed with greater or lesser depth depending upon whether the life of the tool-cutting edge is lesser or greater. The grooves should be formed as deep as possible, if the remainder material located below the grooves is to be thereafter broken through or cracked. The grooves should not, however, be formed so deeply that the material of the metal band on the side lying opposite to that in which the groove is formed is pressed out of the smooth surface of the metal band due to the pressure of the chip-removing tool, such as a planing or turning tool for example, and is thereby capable of damaging the surface of the supporting roller. Due to this requirement, the maximum depth of the groove, depending upon the respective hardness of the metal band, is slightly more than 90 percent of the thickness of the metal band.

Total severance of the metal band by using chip-removing tools in a single operation would respectively require, when changing the desired shape of the cutting edge, a different support roller with the recesses corresponding to the respective shape of the cutting edges. Furthermore, the danger then exists that, when using turning or planing tools or pins with points formed of very hard material such as diamond, for example, as chip-removing tools, the metal band will be lifted by the tools and ripped open in an uncontrollable manner with resultant damage to the tools. A further disadvantage of severing the metal band in a single operation employing chip-removing tools is that undesired burrs can be formed thereby on the cutting edges of the component bands. If the metal band is provided, however, before the final separation, with a groove running along the desired severing line, a separation of the metal band virtually free of burrs is then possible by splitting the remainder material of the metal band located below the groove due to bending back and forth the metal sheet on both sides of the groove, i.e., by breaking the metal sheet along the groove formed therein or by severing the remainder material located at the base of the groove by means of chip-removing tools from the adjacent layers thereof and pressing it in the direction of the groove.

For soft material, or material too ductile to be broken, chip-removing tools are called for when finally separating the metal band into component bands; however, if the material is hard, i.e. brittle, breaking of the metal band along the groove, which economizes on tools, is in order.

The method of severing metal band according to our invention can be effected basically in two ways. Thus, the metal band, after passing through the groove-forming device, is rewound into a package on a takeup reel, and this package alone or together with the takeup reel is inserted in a supply reel device which is located in front of the device for effecting the final separation of the metal band along the groove. Thus, the metal band is finally severed only during a second pass. If chip-removing tools are used for the final separation in the second pass just as for forming the groove in the first pass, the groove-forming device proper can thus advantageously be used during both passes. The metal band has to be fed to groove-forming device serving then as final separating means only so that it presents to the chip-removing tools during the final severing operation, the side thereof located opposite the grooves. When there is a great demand for the component bands, a special machine can, however, be installed as a device for final severing by splitting, which can have a construction largely similar to that of the groove-forming device in order to attain the lowest possible production and storage costs.

After the metal band has passed through the groove-forming device it can then also be fed directly to the device for final separation of the metal band, so that the metal band is provided with grooves and finally severed along the grooves into component bands both in a single pass.

Also according to the invention, the component bands are advantageously taken up in a windup device which also applies the cutting forces. In this case also, several different embodiments are possible. Thus, the windup device can have two takeup reels having cylindrical central portions on which takeup rings are releasably mounted. The component bands of even ordinal numbers can then be wound respectively on one takeup ring of one takeup reel and the component bands of odd ordinal numbers can then be wound respectively on a takeup ring of the other takeup reel. If it turns out, nevertheless, that both takeup reels applying the cutting forces or power are unable to exert the same pull or stress on the individual component bands, then all of the component bands can be wound on only one of the preliminary takeup reels applying the cutting forces. Thereafter, the component bands can be withdrawn from this preliminary takeup reel in a rewinding device and be wound on two final takeup reels having takeup rings releasably mounted on the center cylindrical portions thereof in such a way that the component bands of even ordinal numbers are wound respectively on one takeup ring of one final takeup reel and the component bands of odd ordinal numbers are wound respectively on one takeup ring of the other final takeup reel.

According to our invention, instead of being applied by the respective takeup reels, the cutting forces can also be applied by at least one feed roller pair which is mounted in front of the takeup device as viewed in the feed direction of the metal band.

If it is deemed necessary for the subsequent manufacture, instead of having a takeup device located behind the device for affecting final separation of the metal band along the groove, a severing device can be provided which divides the component bands into plates in a direction transverse to the longitudinal axes of the component bands.

Other features which are considered as characteristic for the invention are set forth in the appended claims.

Although the invention is illustrated and described herein as embodied in Method and Apparatus for Severing Metal Band, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
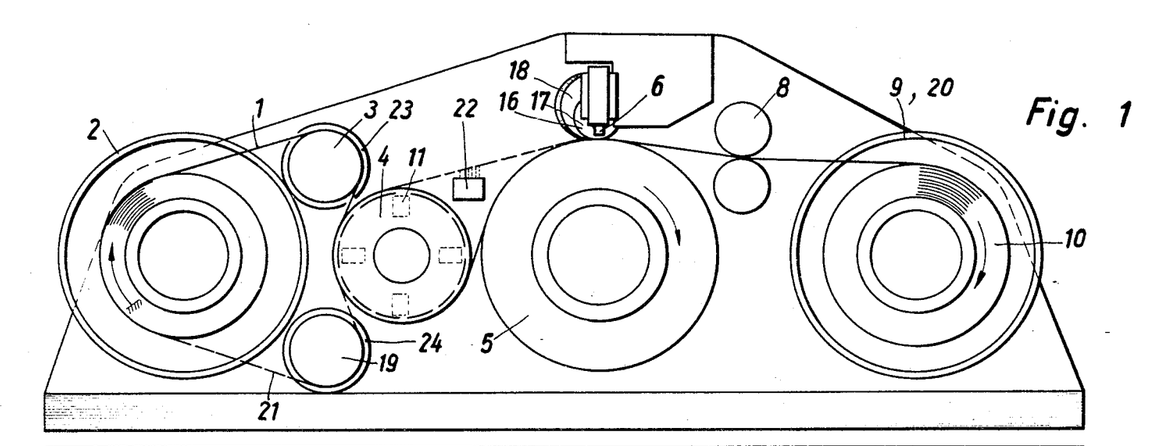
FIG. 1 is a partly diagrammatic side elevational view of the groove-forming device which also acts as final separating device, showing the metal band supply and takeup reels, as constructed in accordance with our invention.
Figure 2:
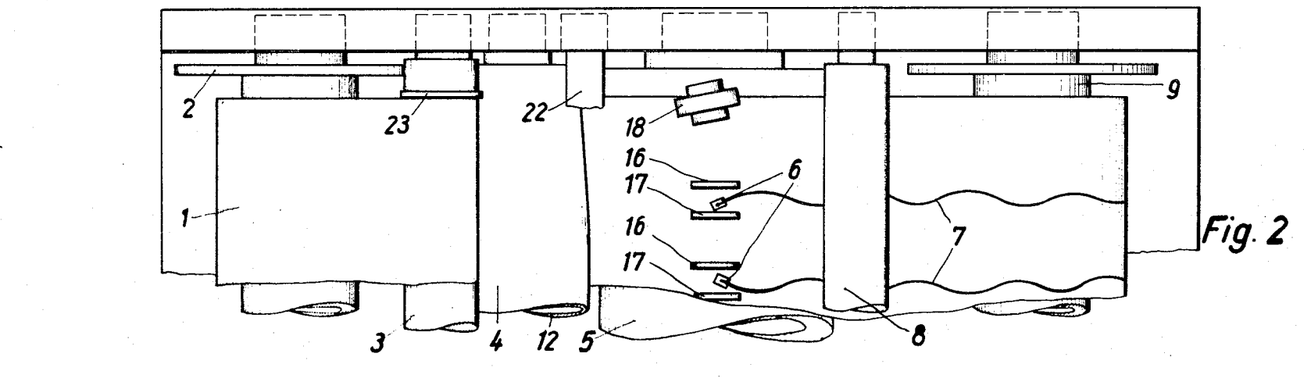
FIG. 2 is a fragmentary top plan view of FIG. 1.

Referring now to the drawings and first, particularly, to FIGS. 1 and 2 thereof, there is shown a metal band 1 which is being drawn off a supply reel 2, and is fed thereafter over a reversing roller 3 and dropped over a relatively large peripheral angle on a support roller 5. The metal band 1 is formed with wave-shaped grooves 7, for example, by chip-removing tools 6 at the support roller 5, and thereafter passes between a guide roller pair 8 and is finally wound into a package 10 on a takeup reel 9.

When cutting the grooves 7 in the metal band 1, the chip-removing tools 6 are displaceable transversely to the direction of feed of the metal band 1 in a conventional manner by a nonillustrated cam which is suitably coupled to a measuring roller 4, but which may also be suitably coupled with the support roller 5. Obviously the transverse adjustment of the tools 6 can also be effected by other means known in control technology. To increase the close friction between the measuring roller 4 and the metal band 1, the measuring roller 4 is provided with permanent magnets 11 and a peripheral layer 12 of elastic material having a high coefficient of friction.

The measuring roller 4 has the function, furthermore, of imparting lateral guidance to the metal band 1 and is therefore slightly tapered as shown in FIG. 2. Also, for lateral guidance, guide rings 23 and 24, transversely displaceable with respect to the direction of feed of the metal band 1, are mounted on the reversing rollers 3 and 19 at each side of the metal band 1 in accordance with the width of the metal band. The reversing rollers 3 and 19 furthermore cause the metal band 1 to run over the measuring roller 4 in contact with a portion of the peripheral surface thereof always subtending the same angle. The guide roller pair 8 also has the same function with respect to the support roller 5.

The wave-shaped grooves 7 must have at least substantially the same cross section along the entire lengths thereof in order to provide trouble-free control of the final separation of the material of the metal band 1 which underlies the grooves 7. If turning or planing tools or milling tools, grinding disks or circular saws rotating counter to or in the same direction as the feed direction of the metal band 1 are employed as the chip-removing tools 6 for forming the grooves 7, they are pivotally mounted in such a way that they are always directed tangentially to the grooves 7 being formed thereby, as shown in FIG. 2. The tools 6, at least for forming grooves 7 with waves having amplitudes that are large relative to the lengths of the waves, are respectively pivotable about an axis which extends radially to the support roller 5 through the point of contact of the respective chip-removing tool 6 with the metal band 1. The pivoting of the tools 6 is controlled also, like the adjustment thereof transversely to the feed direction of the metal band 1, by the aforementioned nonillustrated cam. When end-milling cutters and grinding pins rotatable about their longitudinal axis or nonrotating pins that are provided with a pyramidal point, as well as means for providing a fluid jet of high velocity are employed as the chip-removing tools 6 for forming the grooves 7 in the metal band 1, a pivoting movement of the tools 7 is unnecessary.

In order to prevent the metal band 1 from lifting from the support thereof, i.e., the support roller 5, in the vicinity of the chip-removing tools 6 for forming the grooves 7, and from being ripped open in an uncontrollable manner by the tools 6, as has been found by experiment to happen in such case and described hereinbefore, with resultant damage to the tools 6, pressure rollers 16 and 17 are respectively located at both sides of each of the chip-removing tools 6. The mutual spacing of the pressure rollers 16 and 17 corresponds to the travel of the respective tool 6 located therebetween when adjusted transversely relative to the metal band feed direction.

Slightly upstream of the chip-removing tools 6 in the feed direction of the metal band 1, there are mounted symmetrically to the centerline of the metal band 1 two inclined rollers 18 respectively pressing the edges of the metal band 1 against the underlying support roller 5. Due to the fact that the axes of the inclined rollers 18 and the longitudinal axis of the metal band 1 define a sharp angle which opens in direction toward the supply reel 2, the metal band 1 is subjected to a respectively equal pull or tension at both sides thereof so that is smoothed out on the support roller 5. The inclined rollers 18 are both pivotable to adjust the acute angle defined by their axes with the axis of the metal band 1 as well as adjustable transversely to the metal band feed direction so as to accommodate metal bands of varying widths.

The support roller 5 is provided with a layer of hard ceramic material for largely preventing damage to the surface of the support roller 5 at the first pass due to the pressure exerted by the chip-removing tools 6 on the support roller 5 through the material of the metal band 6 remaining beneath the grooves 7 formed in the metal band. The support roller 5 can, however, also be surface hardened.

When the metal band 1 has been provided along the entire length thereof with grooves 7 and wound into a package 10 on the takeup reel 9, the package 10 is then inserted in the supply reel 2 quite the reverse of the previous step wherein the metal band package which had not yet been provided with grooves was inserted in the supply reel 2. The metal band 1 is again drawn off the supply reel 2, passes over the reversing roller 19 and measuring roller 4, and is then fed to the groove-forming device which now serves as a device for finally separating the component bands along the grooves 7. The grooved band 6 then runs in a second pass again over the support roller 5 along a peripheral surface portion thereof of predetermined angle and is separated from the side of the metal band 1 located opposite the grooves 7 into component bands by the tools 6 serving now as final splitting tools. The component bands then pass through the nip between the guide roller pair 8 and are then wound up entirely on the takeup reel 9 which now serves as the preliminary takeup reel 20 of the takeup device. The travel of the metal band 1 in the course of its second pass through the apparatus of the invention, is shown schematically in FIG. 1 by the dotted line 21.

The transverse adjustment and pivoting movement of the chip-removing tools 6 serving as the final splitting tools during the second pass of the metal band 1 through the apparatus of the invention are then controlled by a sensing member 22 upstream of the tools 6 in the feed direction of the metal band 7 during the second pass thereof. The sensing member 22 operates in accordance with the known principle of the magnetic field line concentration due to surface damage and senses the location of the grooves 7.

Figure 3:
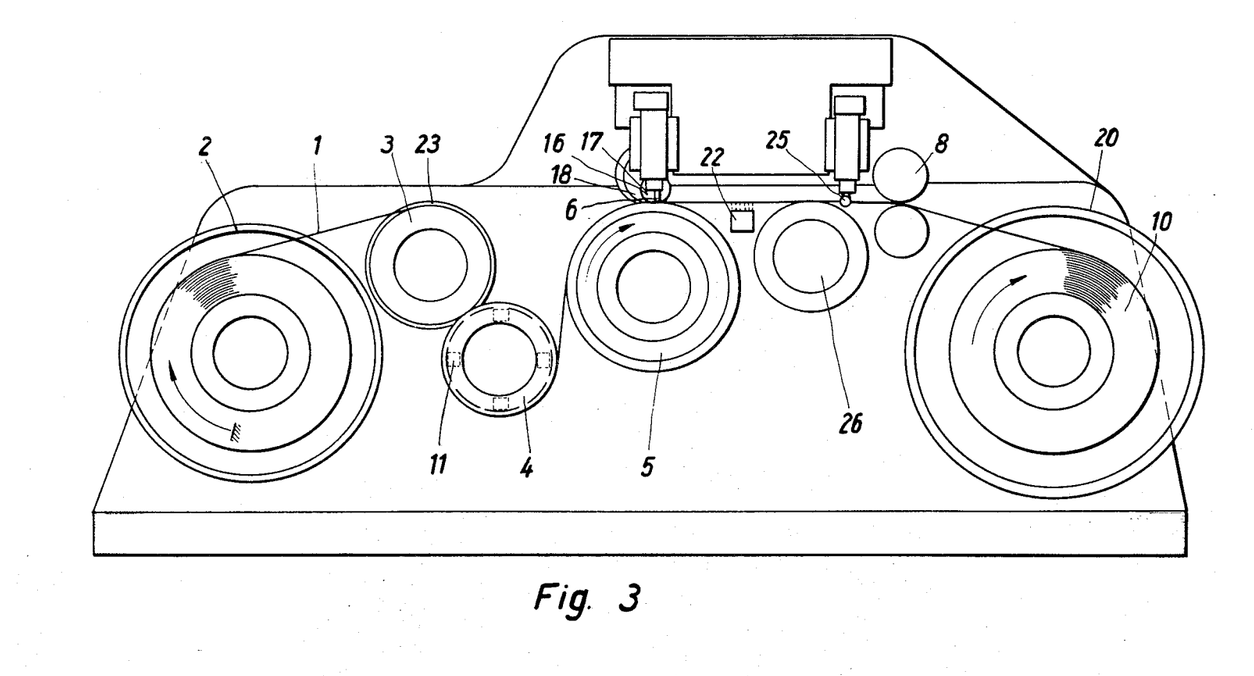
FIG. 3 is a partly diagrammatic side elevational view of another embodiment of FIG. 1 showing a supply reel, a groove-forming device, a directly following device for finally separating the metal band by splitting the remainder material at the base of the groove formed in the metal band, and a preliminary takeup reel of the takeup device.
Figure 7:
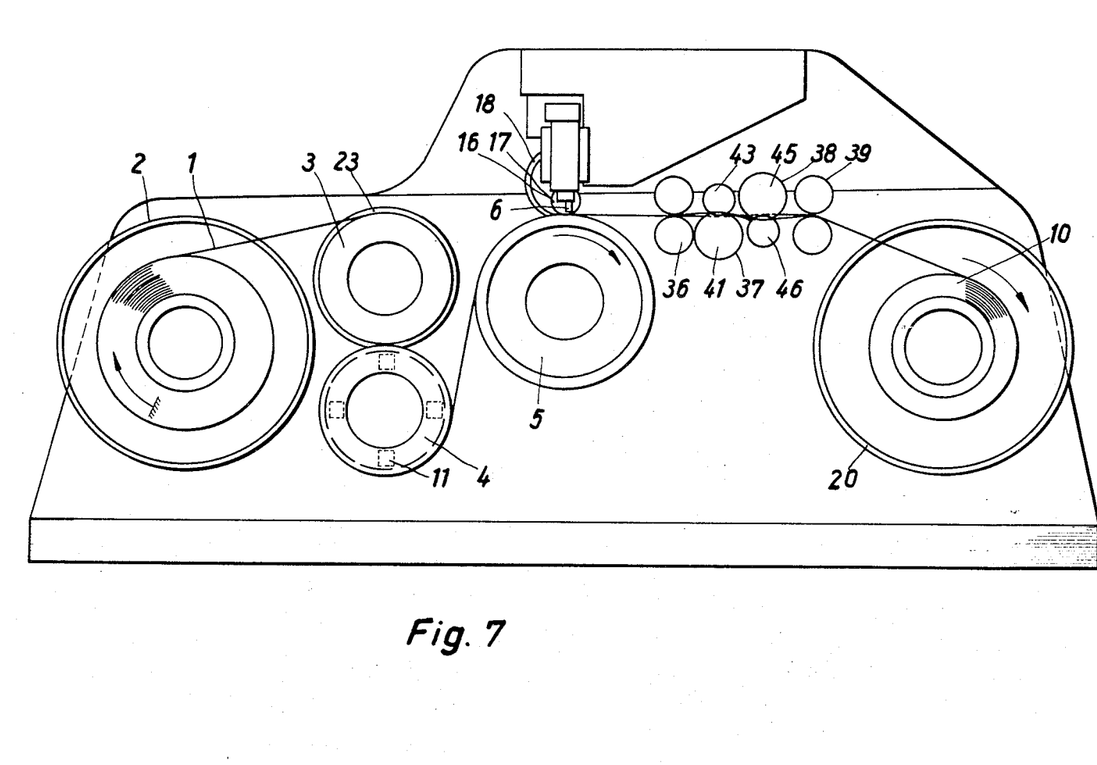
FIG. 7 is a partly diagrammatic side elevational view corresponding to that of FIG. 3 of another embodiment having a device for finally separating the metal band by ripping or breaking through the remainder material located at the base of the groove.

As shown already in FIGS. 1 and 2, in the embodiments of FIGS. 3 and 7, the metal band 1 is first drawn off the supply reel 2, passes over the reversing roller 3, the measuring roller 4 and the support roller 5, and is formed at the support roller 5 with grooves 7 by chip-removing tools 6 which are transversely adjustable and pivotable in the same manner as in the aforedescribed embodiment of FIGS. 1 and 2. However, in the embodiments of FIGS. 3 and 7, the metal band 1 is fed to the final splitting device directly after the metal band 1 has run through the groove-forming device, i.e. the metal band 1 passes through both the groove-forming and the final splitting devices in a single pass.

In the embodiment of FIG. 3, the final separation of the component bands is effected by splitting the remainder material of the metal band 1 underlying the grooves 7 formed therein. As viewed in the feed direction of the metal band 1, just before the tools 25 serving as final splitting tools, there is mounted a tensioning roller 26 on which the side of the metal band 1 located opposite the grooves 7 is disposed. The tools 25 serving as final splitting tools, in a manner similar to the chip-removing tools 6 which form the grooves 7 in the metal band 1, are displaceable transversely to the band feed direction, that they are always capable of following the grooves 7 of the metal band 1. This transverse displacement is controlled by the sensing member 22 which is, however, located in the embodiment of FIG. 3 behind the groove-forming device. It is also possible, however, to make the control of the transverse displacement directly dependent upon the transverse adjustment of the chip-removing tools 6 which form the grooves 7.

Figures 4A, 4B, 4C, 4D:
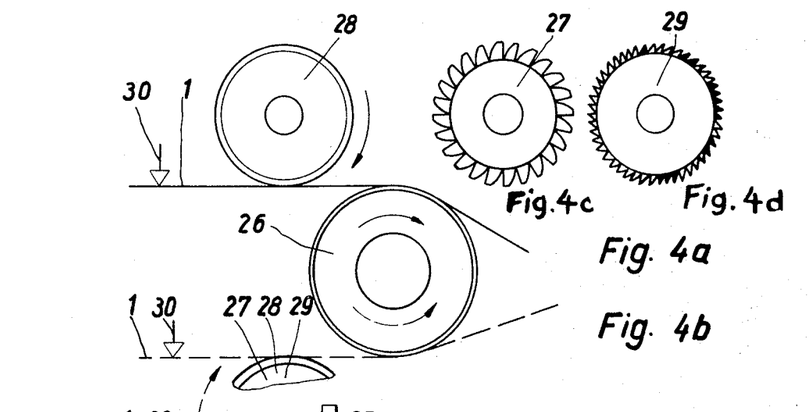
FIGS. 4a to 4d, 5a, 5b, 6a and 6b are side views of various tools for finally splitting the metal band along the groove previously formed therein.
Figure 5A:
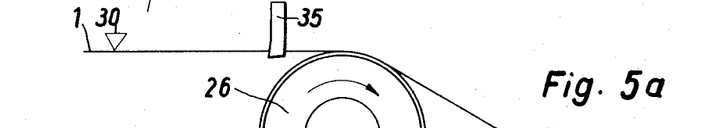
Figures 5B, 6A:
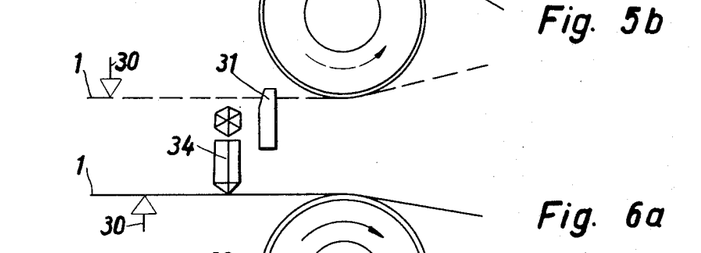
Figure 6B:
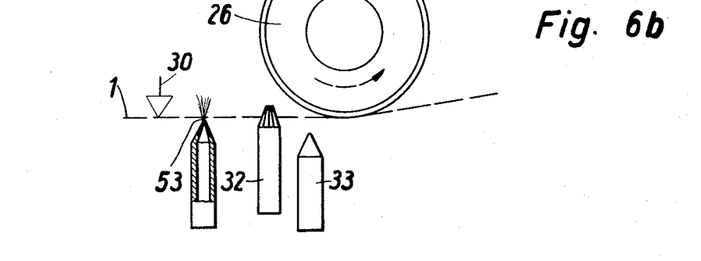

The tool 25 of FIG. 3, serving as final splitting tool, is shown schematically in FIG. 4a as a guiding disk 28, in FIG. 4c as a milling tool 27, and in FIG. 4d as a circular saw 29, and are respectively located at the side of the metal band 1 on which the grooves are formed, represented in FIG. 4a by the arrow 30, and are rotatable counter to the feed direction of the metal band 1. It is also possible, as shown in FIG. 4b, to arrange the tools 27, 28 and 29 on the side of the metal band 1 opposite the grooves formed therein and to rotate them in the same direction as the metal band feed direction. It is furthermore also conceivable to employ planing tools 31 with positive angle of inclination (FIG. 5b), end-milling cutters 32 rotatable about their longitudinal axis, grinding pins 33 or fluid jets 53 of high velocity, all shown schematically in FIG. 6b, or pins 34 provided with a pyramidal point (FIG. 6a), as final splitting tools located on the side of the metal band 1 opposite the grooves 7 formed therein. In FIG. 5a there is shown as a further embodiment of a tool serving as a final splitting tool, a planing tool 35 with negative angle of inclination located on the side 30 of the metal band 1 in which the grooves are formed. The planing tool 35 of FIG. 5a, as also the milling cutters 27, the grinding disks 28 and the circular saws 29, which are located on the side of the metal band 1 being formed with the grooves and are rotatable counter to the band feed direction, pass through the metal band, and press into the grooves the remainder material of the metal band 1 underlying the grooves, so that the formation of a burr at the surface of the metal band 1 is avoided. When using such tools 25 serving as final splitting tools, which are located on the side of the metal band 1 opposite the grooves 7, it is also possible to arrange the tension roller 26 directly beneath these tools.

Analogous to the pivotability of the aforedescribed chip-removing tools 6 which form the grooves 7, the hereinafter-noted tools 25 serving as final splitting tools are disposed respectively pivotable about an axis which extends perpendicularly to the metal band 1 through the point of contact of the respective tool 25 serving as final splitting tool, so that the tool 25 is always directed tangentially to the direction of the formed grooves 7. Tools 25 of this pivotal arrangement are exemplified by the milling tools 27, the grinding disks 28, the circular saws 29, the planing tools 31 with positive angle of inclination as well as the planing tools 35 with negative angle of inclination.

After the metal band 1 has been divided into component bands by the tools 25 serving as final splitting tools, the component bands still pass between the guide roller pair 8 and are then entirely wound on the preliminary takeup reel 20 of the takeup device (FIG. 3).

In the embodiment shown in FIG. 7, the metal band 1 provided with the grooves 7 first passes between a guide roller pair 36 and is then broken into component bands as it passes between the respective rollers of the two breaker rollers pairs 37 and 38. The component bands then pass between a guide roller pair 39 and are then wound up entirely by the preliminary takeup reel 20 of the windup device.

Figure 8:
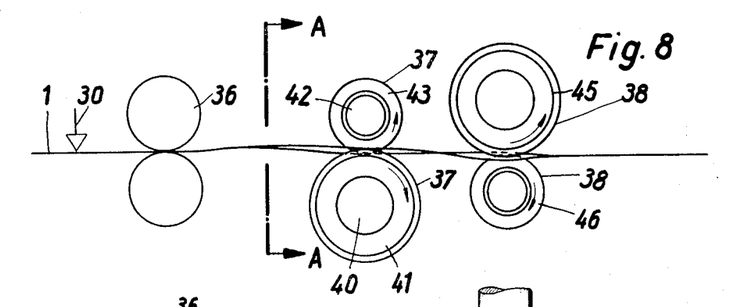
FIG. 8 is a diagrammatic and enlarged view of the roller arrangement in the device shown in FIG. 7 for finally separating the metal band by ripping or breaking through the remainder material.
Figure 9:
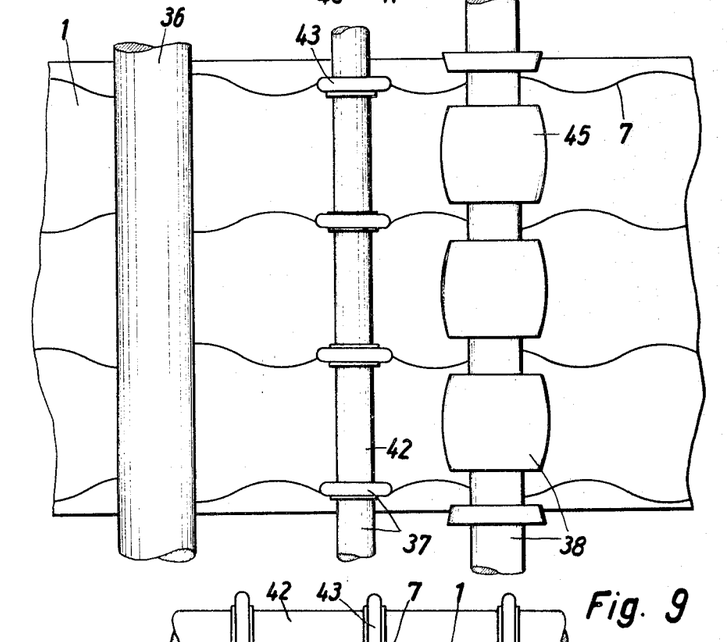
FIG. 9 is a top plan review of FIG. 8.
Figure 10:
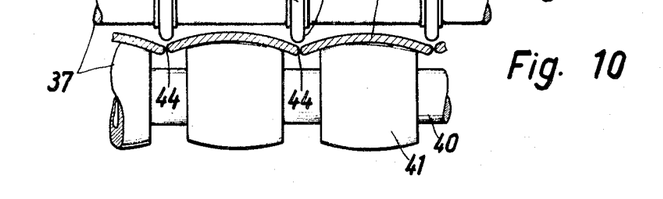
FIG. 10 is a cross sectional view of FIG. 8 taken along the line A—A therein.

FIGS. 8 to 10 show that the breaker roller unit 37 first traversed by the metal band 1 is provided with a curved or cambered construction on the side of the metal band 1 located opposite the grooves 7, and with divider rollers 41 loosely mounted on a shaft 40 and having an axial dimension corresponding to the smallest transverse dimension of the component band corresponding to each partition roller. On the side of the metal band 1 provided with the grooves 7, the breaker roller unit 37 possesses divider disks 43 having greatly cambered or curved construction and also being loosely mounted on a common shaft 42 thereof. The divider disks 43 have an axial dimension corresponding to the travel of the chip-removing tools 6 for forming the grooves 7 as they are adjusted transversely to the feed direction of the metal band 1, and have a mutual spacing corresponding to the axial dimensions of the divider rollers 41.

Due to the fact that the mutual spacing of the centerlines of the shafts 40 and 42, as seen in FIG. 10, is substantially equal to the sum of the center radii of the divider rollers 41 and the divider disks 43, the metal band 1 is bent so that the remainder material at the point 44 underlying the respective groove 7 rips at least partly open. Since the divider rollers 45 of the next-succeeding breaker roller unit 38 are then disposed on the side of the metal band 1 formed with the grooves 7, and the divider disks 46 thereof on the side lying opposite the grooves analogous to the divider roller and divider disk arrangement of the breaker roller unit 37, the metal band 1 is bent in the opposite direction than in the breaker roller unit 37 and the portion of the remainder material not yet divided is then also ripped open, i.e., the metal band 1 is broken through along the length of the grooves 7. If the back-and-forth bending of the metal band 1 through two breaker roller units is still insufficient for effecting cleavage of the remainder material along the grooves, obviously the metal band 1 can then be passed through additional breaker roller units.

Figure 11:
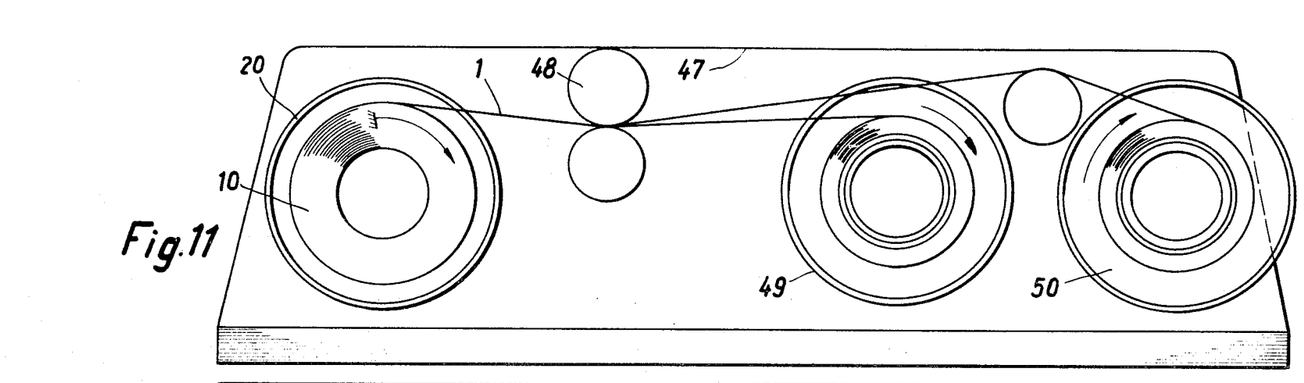
FIG. 11 is a side elevational view of a rewinding device according to our invention.
Figure 12:
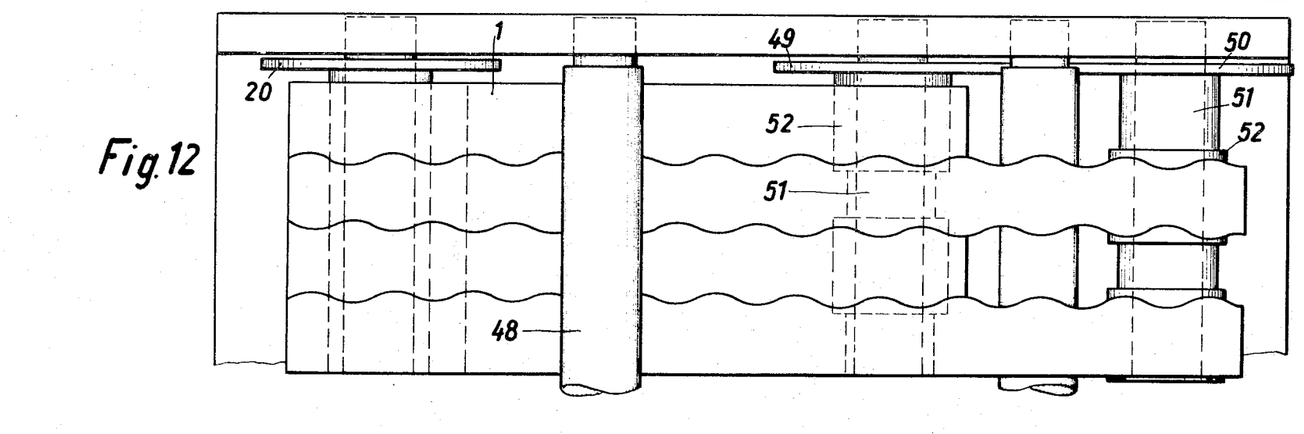
FIG. 12 is a fragmentary top plan view of FIG. 11.

In FIGS. 11 and 12 there is illustrated a rewinding device 47 belonging to a windup device and there is shown how the component bands are drawn off the preliminary takeup reel 20 and are wound up on two final takeup reels 49 and 50 after passing through a guide roller pair 48. Takeup rings 52 are loosely mounted on the cylindrical center portions 51 of the two final takeup reels 49 and 50, a takeup ring being provided for each component band.

With the aid of the method and apparatus of our invention, metal bands of relatively great length are capable of being divided in relatively short time into component bands with wave-shaped or straight cutting edges without additional lengthening of the individual component bands and virtually without the formation of burrs, disadvantages that were common to the heretofore known methods and apparatus of this general type.

We claim:

1. Apparatus for severing metal band comprising a supply reel device for supplying a metal band in a given feed direction, a groove-forming device including chip-removing tool means for forming a groove in the metal band extending in the feed direction thereof, supporting roller means and measuring roller means having peripheral surfaces partly engageable by the metal band in said feed direction, a device for finally separating the metal band along a groove formed in the band, a windup device having at least one takeup reel for winding thereon component bands separated from the grooved metal band, and including a pair of inclined rollers disposed symmetrically with respect to the center of the metal band and respectively adapted to press the lateral edges of the metal band against said supporting roller means, said inclined rollers having axes forming a sharp angle with the longitudinal axis of the metal band opening in direction toward said supply reel means.

2. Apparatus for severing metal band comprising a supply reel device for supplying a metal band in a given feed direction, a groove-forming device including chip-removing tool means for forming a groove in the metal band extending in the feed direction thereof, supporting roller means and measuring roller means having peripheral surfaces partly engageable by the metal band in said feed direction, a device for finally separating the metal band along a groove formed in the band, a windup device having at least one takeup reel for winding thereon component bands separated from the grooved metal band, and said groove-forming tool means being mounted pivotally about an axis extending radially to said supporting roller means through a contact point of said groove-forming tool means with the metal band, said groove-forming tool means being always directed tangentially to the groove being formed thereby in the metal band.

3. Apparatus for severing metal band comprising a supply reel device for supplying a metal band in a given feed direction, a groove-forming device including chip-removing tool means for forming a groove in the metal band extending in the feed direction thereof, supporting roller means and measuring roller means having peripheral surfaces partly engageable by the metal band in said feed direction, a device for finally separating the metal band along a groove formed in the band, a windup device having at least one takeup reel for winding thereon component bands separated from the grooved metal band, and said measuring roller means is located upstream of said groove-forming tool means in said feed direction, said measuring roller means is provided with a plurality of magnets.

4. Apparatus for severing metal band comprising a supply reel device for supplying a metal band in a given feed direction, a groove-forming device including chip-removing tool means for forming a groove in the metal band extending in the feed direction thereof, supporting roller means and measuring roller means having peripheral surfaces partly engageable by the metal band in said feed direction, a device for finally separating the metal band along a groove formed in the band, a windup device having at least one takeup reel for winding thereon component bands separated from the grooved metal band, and said measuring roller means is located upstream of said groove-forming tool means in said feed direction, said measuring roller means has a peripheral layer of elastic material of high coefficient of friction.

5. Apparatus for severing metal band comprising a supply reel device for supplying a metal band in a given feed direction, a groove-forming device including chip-removing tool means for forming a groove in the metal band extending in the feed direction thereof, supporting roller means and measuring roller means having peripheral surfaces partly engageable by the metal band in said feed direction, a device for finally separating the metal band along a groove formed in the band, a windup device having at least one takeup reel for winding thereon component bands separated from the grooved metal band, and said measuring roller means is located upstream of said groove-forming tool means in said feed direction, said measuring roller means has a cambered construction.

6. Apparatus for severing metal band comprising a supply reel device for supplying a metal band in a given feed direction, a groove-forming device including chip-removing tool means for forming a groove in the metal band extending in the feed direction thereof, supporting roller means and measuring roller means having peripheral surfaces partly engageable by the metal band in said feed direction, a device for finally separating the metal band along a groove formed in the band, a windup device having at least one takeup reel for winding thereon component bands separated from the grooved metal band, and said final separating device including at least one breaker roller unit having a cambered construction on one side of the metal band, shaft means for carrying said breaker roller, divider rollers loosely seated on said shaft and coaxial to one another, the axial dimension of said divider rollers corresponding to the smallest transverse dimension of the component band corresponding to each divider roller, and, on the opposite side of the metal band, a plurality of divider disks loosely mounted on respective shafts and coaxial to one another, said divider disks being of greatly cambered construction, the axial dimensions of said divider disks corresponding to the transversely adjustable travel distance of said groove-forming chip-removing tool means, and the spacing between said divider discs corresponding to the axial dimensions of said divider rollers.

7. Device according to claim 6 wherein the axial spacing of said divider rollers and said divider disks are at most equal to the sum of the center radii.

8. Device according to claim 6 wherein said divider rollers of the respective breaker roller unit with an odd ordinal number counting in the feed direction is located on the side of the metal band opposite the groove, and said divider rollers of the respective breaker roller unit with an even ordinal number is located on the side of the metal band in which the groove is formed.

9. Device according to claim 6 including a respective guide roller pair located downstream and upstream of said breaker roller units in said feed direction.

* * * * *